United States Patent
Chen et al.

(10) Patent No.: US 11,122,644 B2
(45) Date of Patent: Sep. 14, 2021

(54) DEVICE AND METHOD OF REDIRECTING A COMMUNICATION DEVICE

(71) Applicant: ACER INCORPORATED, New Taipei (TW)

(72) Inventors: Hung-Chen Chen, New Taipei (TW); Ching-Wen Cheng, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 15/673,425

(22) Filed: Aug. 10, 2017

(65) Prior Publication Data

US 2018/0049267 A1 Feb. 15, 2018

Related U.S. Application Data

(60) Provisional application No. 62/373,954, filed on Aug. 11, 2016.

(51) Int. Cl.
*H04W 76/27* (2018.01)
*H04W 76/10* (2018.01)
(Continued)

(52) U.S. Cl.
CPC ............ *H04W 76/27* (2018.02); *H04W 8/22* (2013.01); *H04W 48/06* (2013.01); *H04W 76/10* (2018.02);
(Continued)

(58) Field of Classification Search
CPC ..... H04W 48/06; H04W 48/18; H04W 76/10; H04W 76/27; H04W 28/08; H04W 28/24; H04W 84/18; H04W 8/22; H04W 36/06
See application file for complete search history.

(56) References Cited

U.S. PATENT DOCUMENTS

| | | | | |
|---|---|---|---|---|
| 2010/0009682 A1* | 1/2010 | Iwamura | ............... | H04W 36/06 455/436 |
| 2014/0136709 A1* | 5/2014 | Chin | ...................... | H04W 4/12 709/226 |

(Continued)

FOREIGN PATENT DOCUMENTS

| CN | 101523949 A | 9/2009 |
|---|---|---|
| CN | 101690374 A | 3/2010 |

(Continued)

OTHER PUBLICATIONS

Ericsson, Solution for selection of a network slice instance, 3GPP, SA WG2 Meeting #116, S2-164258, revision of S2-163978, Jul. 11-15, 2016, Vienna, AT, pp. 1-5, XP051121881.

(Continued)

*Primary Examiner* — Margaret G Mastrodonato
(74) *Attorney, Agent, or Firm* — Winston Hsu

(57) ABSTRACT

A communication device for redirecting the communication device comprises a storage device for storing instructions and a processing circuit coupled to the storage device. The processing circuit is configured to execute the instructions stored in the storage device. The instructions comprise performing a first random access (RA) procedure with a first node; transmitting information of a service to the first node, when performing the first RA procedure; receiving a RRC redirection command message for redirecting the communication device to at least one second node from the first node, after transmitting the information of the service; selecting a first one of the at least one second node according to the RRC redirection command message; and performing a second RA procedure with the first one of the at least one second node.

20 Claims, 12 Drawing Sheets

(51) Int. Cl.
  *H04W 8/22* (2009.01)
  *H04W 48/06* (2009.01)
  *H04W 28/24* (2009.01)
  *H04W 48/18* (2009.01)
  *H04W 84/18* (2009.01)

(52) U.S. Cl.
  CPC ............ *H04W 28/24* (2013.01); *H04W 48/18* (2013.01); *H04W 84/18* (2013.01)

(56) References Cited

U.S. PATENT DOCUMENTS

2015/0092630 A1    4/2015    Lin
2016/0007239 A1    1/2016    Manepalli
2017/0367036 A1*   12/2017   Chen .................... H04W 76/10

FOREIGN PATENT DOCUMENTS

| CN | 102685684 A | 9/2012 |
| CN | 102892081 A | 1/2013 |
| CN | 103327514 A | 9/2013 |
| CN | 105637779 A | 6/2016 |
| EP | 3 214 872 A1 | 9/2017 |
| WO | 2008054114 A2 | 5/2008 |
| WO | 2014154851 A1 | 10/2014 |

OTHER PUBLICATIONS

3GPP TSG-RAN WG2 Meeting#96 Tdoc R2-168076, Reno, USA, Nov. 2016.
3GPP TSG-RAN WG2 NR Ad Hoc Tdoc R2-1700261, Spokane, US, Jan. 2017.
3GPP TSG-RAN WG2 NR Adhoc Meeting, R2-1700320, Spokane, USA, Jan. 2017.
3GPP TS 36.321 V14.3.0, Jun. 2017.

* cited by examiner

DEVICE AND METHOD OF REDIRECTING A COMMUNICATION DEVICE

CROSS REFERENCE TO RELATED APPLICATIONS

This application claims the benefits of U.S. Provisional Applications No. 62/373,954, filed on Aug. 11, 2016, which is incorporated herein by reference.

BACKGROUND OF THE INVENTION

1. Field of the Invention

The present invention relates to a device and a method used in a wireless communication system, and more particularly, to a device and a method of redirecting a communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network (CN) including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

A fifth generation (5G) new radio access network (5G-NR) is an evolution of a continuous mobile broadband process to meet the requirements of 5G as introduced by International Mobile Telecommunications (IMT)-2020. The 5G-NR may include cells operated on carrier frequencies (e.g., cells with lower frequencies support a coverage of a 5G-NR NB (gNB), and cells with higher frequencies provide high throughputs).

A UE may establish a first connection with a first node of a network. However, the first node may not support a service requested by the UE. Thus, the UE may need to establish a second connection to a second node of the network, after establishing the first connection with the first node and being rejected by the first node. Alternatively, the UE may execute a handover command received from the first node to communicate with the second node, after establishing the first connection with the first node. The above processes may be performed repeatedly until the UE establishes a third connection with a third node supporting the service requested by the UE. As a result, connections between the UE and the nodes are established inefficiently and resources for establishing the connections are wasted.

Thus, how to redirect the UE is an important problem to be solved.

SUMMARY OF THE INVENTION

The present invention therefore provides a method and related communication device for redirecting a communication device to solve the abovementioned problem.

A communication device for redirecting the communication device comprises a storage device for storing instructions and a processing circuit coupled to the storage device. The processing circuit is configured to execute the instructions stored in the storage device. The instructions comprise performing a first random access (RA) procedure with a first node; transmitting information of a service to the first node, when performing the first RA procedure; receiving a radio resource connection (RRC) redirection command message for redirecting the communication device to at least one second node from the first node, after transmitting the information of the service; selecting a first one of the at least one second node according to the RRC redirection command message; and performing a second RA procedure with the first one of the at least one second node.

A first node for redirecting a communication device comprises a storage device for storing instructions and a processing circuit coupled to the storage device. The processing circuit is configured to execute the instructions stored in the storage device. The instructions comprise performing a random access (RA) procedure with the communication device; receiving information of a service from the communication device, when performing the RA procedure; and transmitting a radio resource connection (RRC) redirection command message for redirecting the communication device to the at least one second node to the communication device, in response to the information of the service.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
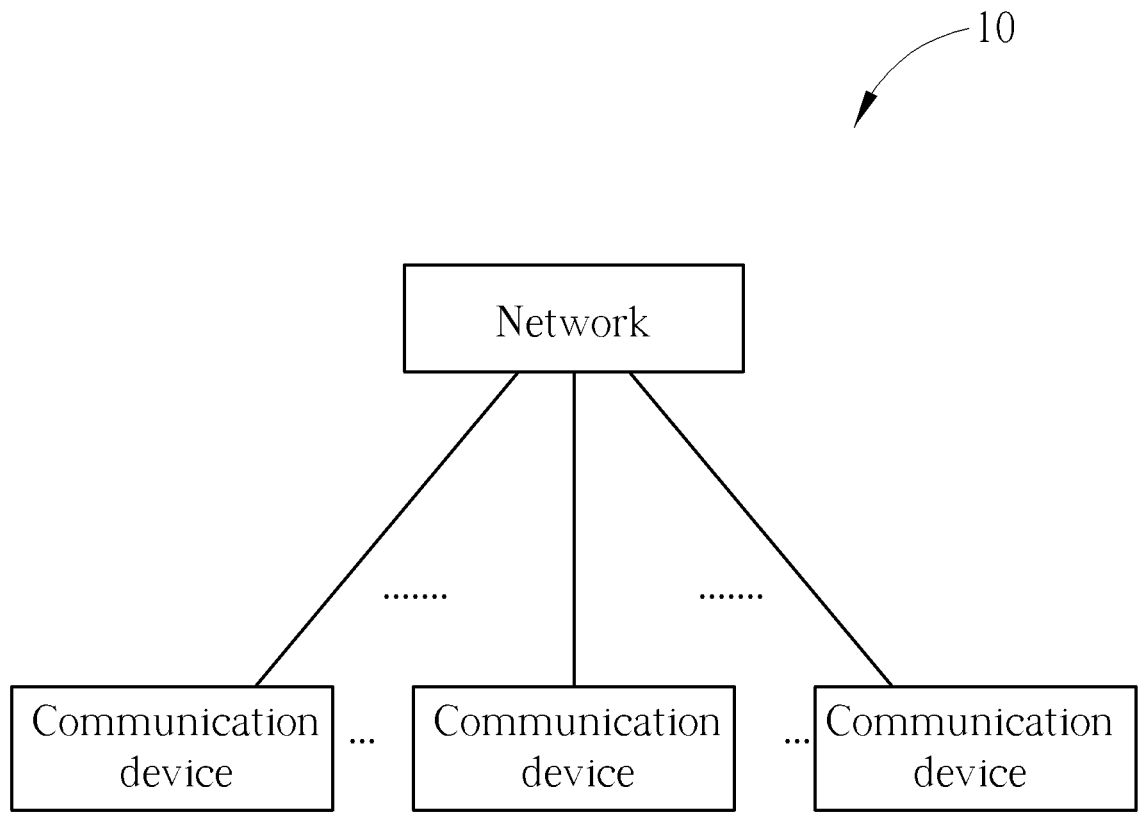
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s), licensed spectrum(s)) and/or unlicensed carrier(s) (unlicensed serving cell (s), unlicensed spectrum(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

Methods of utilizing an unlicensed carrier are various. For example, for a communication system (e.g., wireless communication system 10) which includes at least one base station (BS), it may provide a wireless service via the unlicensed carrier without an assistance from a licensed serving cell, i.e., the communication system is not a LAA system. Accordingly, a communication device may communicate with the at least one BS via only the unlicensed carrier. In another example, the communication device may communicate with more than one BSs (e.g., 2) in a same time period (e.g., dual connectivity). One of the BSs may only be configured with the unlicensed carrier for the wireless service.

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. In one example, the network may be a fifth generation (5G) new radio access network (5G-NR) including at least one 5G-NR NB (gNB).

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
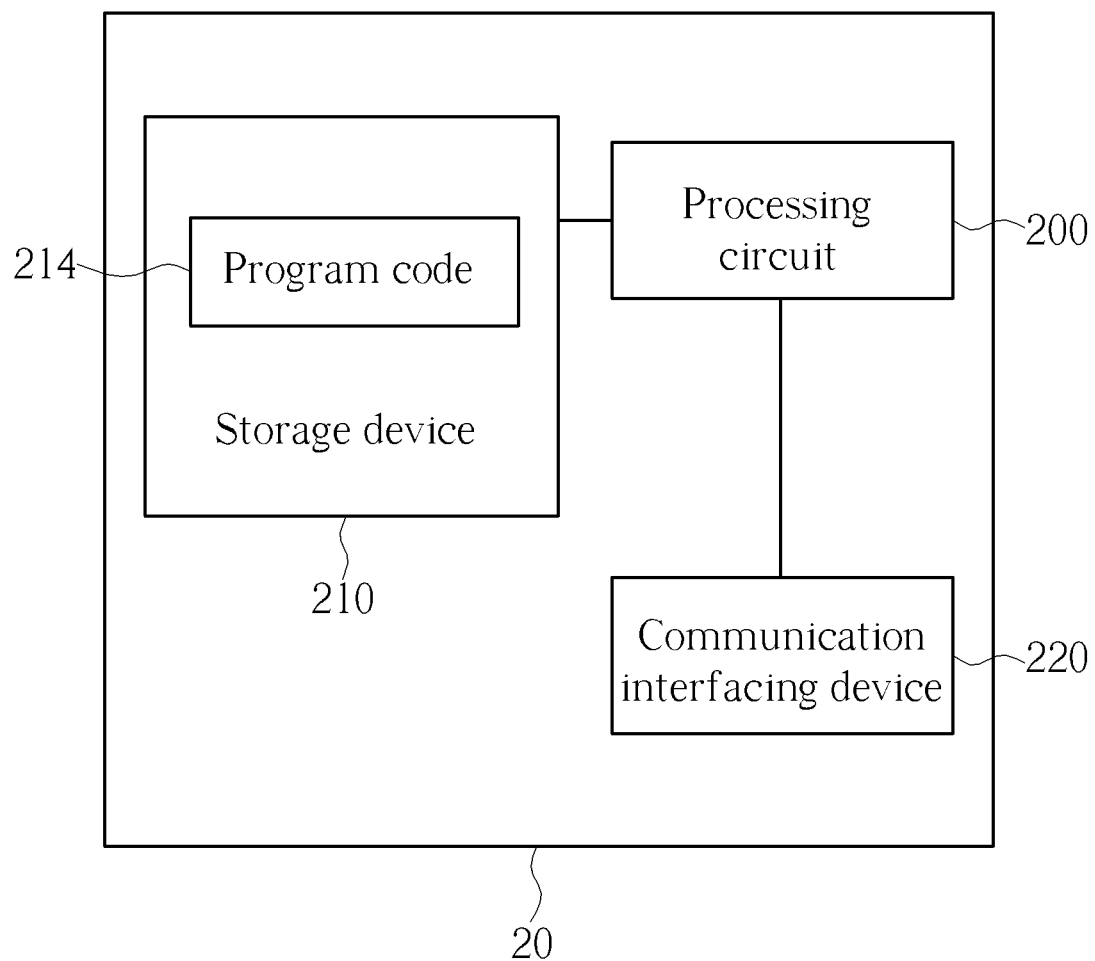
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

Figure 3:
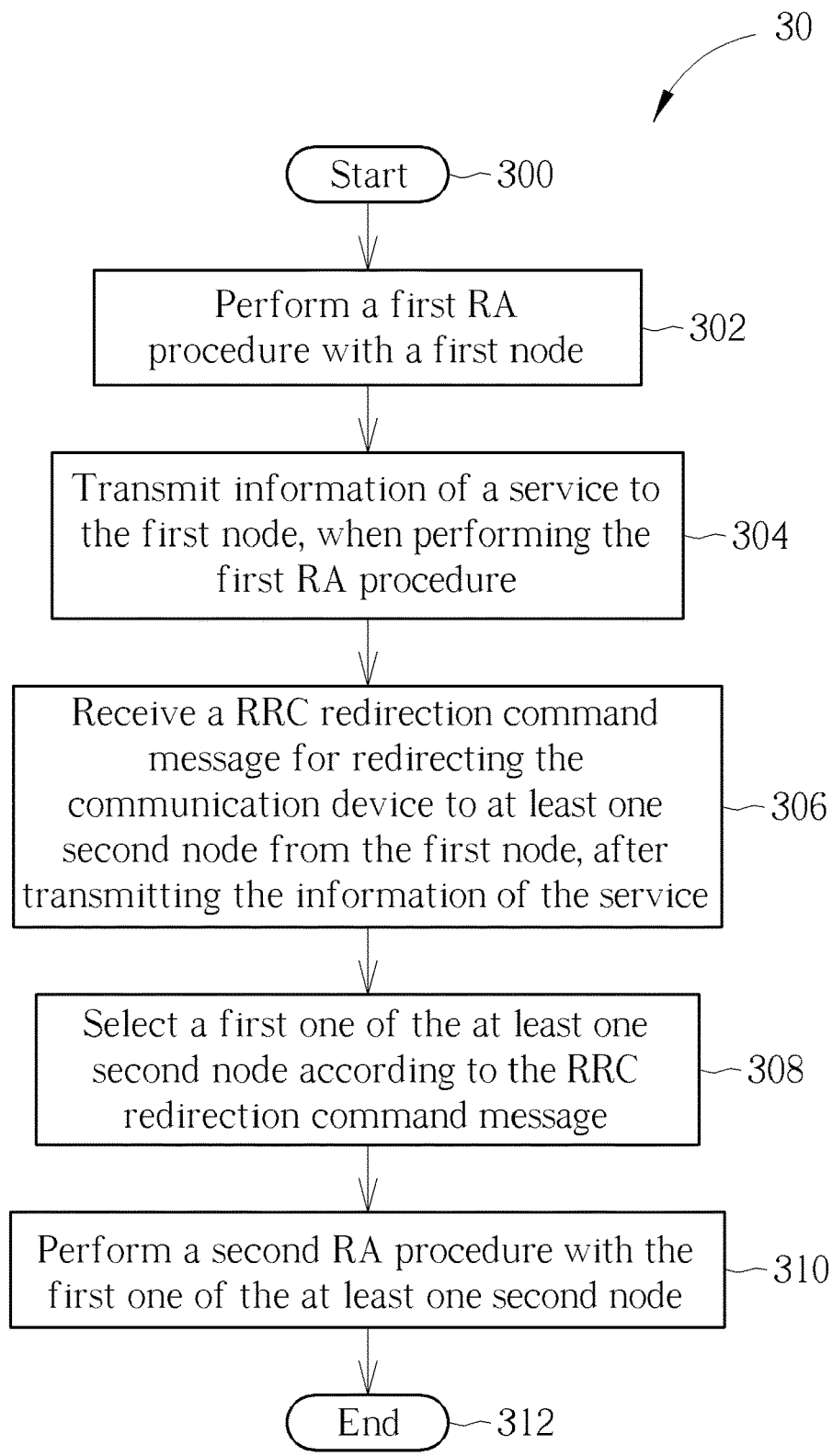
FIG. 3 is a flowchart of a process according to an example of the present invention.

FIG. 3 is a flowchart of a process 30 according to an example of the present invention. The process 30 may be utilized in a communication device (e.g., shown in FIG. 1), to redirect the communication device. The process 30 may be compiled into the program code 214 and includes the following steps:

Step 300: Start.

Step 302: Perform a first random access (RA) procedure with a first node.

Step 304: Transmit information of a service to the first node, when performing the first RA procedure.

Step 306: Receive a radio resource control (RRC) redirection command message for redirecting the communication device to at least one second node from the first node, after transmitting the information of the service.

Step 308: Select a first one of the at least one second node according to the RRC redirection command message.

Step 310: Perform a second RA procedure with the first one of the at least one second node.

Step 312: End.

According to the process 30, the communication device (e.g., in an IDLE/INACTIVE state) may perform a first RA procedure with a first node. The communication device may transmit information of a service to the first node, when performing the first RA procedure. Then, the communication device may receive a RRC redirection command message (e.g., RRCRedirectionCommand) for redirecting the communication device to at least one second node the service from the first node, after transmitting the information of the service. The RRC redirection command message may be used for a purpose of a traffic load balance of the first node, a processing load balance of the first node, or a service supported by the first node. The communication device may select a first one of the at least one second node according to (e.g., listed in) the RRC redirection command message. The communication device may perform a second RA procedure with the first one of the at least one second node. That is, the communication device is redirected from the first node to the first one of the at least one second node during the first RA procedure. Thus, the communication device may establish a second connection to the first one of the at least one second node without establishing a first connection with the first node (e.g., is rejected by the first node), or executing a handover command received from the first node for communicating with the first one of the at least one second node after establishing the first connection with the first node. As a result, connections between the communication device and the nodes can be established efficiently and resources for establishing the connections can be saved.

Realization of the process 30 is not limited to the above description. The following examples may be applied for realizing the process 30.

In one example, the communication device may perform the first RA procedure with the first node by transmitting a first RA request message (e.g., "Msg1") including a first preamble to the first node, and by receiving a first RA response message (e.g., "Msg2") from the first node after transmitting the first RA request message.

In one example, the information of the service may be transmitted in a RRC message (e.g., RRCConnectionRequest) to the first node via. In one example, the RRC message may be carried in a "Msg3" of the first RA procedure. In one example, the information of the service may be transmitted to the first node via a random access resource (e.g., time/frequency resource(s), preamble(s)). The preamble(s) may be medium access control (MAC) signal(s). In one example, the random access resource may be carried in a "Msg1" of the first RA procedure. In one example, the communication device may select the preamble(s) from a preamble group corresponding to the information of the service (e.g., a service type of the service). That is, different preamble groups may be corresponding to different service types. A relation (e.g., mapping) between the preamble groups and the service types may be provided in system information transmitted from the first node, may be configured by the network, or may be specified in the 3GPP standard.

In one example, a size of the "Msg3" may be previously defined (e.g., normal) or newly defined (e.g., extended) in the 3GPP standard. For one example, the size of the "Msg3" may be fixed, e.g., determined according to a preamble selected by the communication device (i.e., the first preamble) or a size of granted UL resource(s). For one example, the size of the "Msg3" may be flexible. In one example, the size of the "Msg3" may be determined according to a selected preamble group of the Msg1, which is an indication of parameters that may be carried in the "Msg3". In one example, the size of the "Msg3" may be determined according a size of an UL grant in "Msg2" or an indication in "Msg2", which are indications of parameters that may be carried in the "Msg3" of the first RA procedure. In one example, the indication in the "Msg2" may be a new (e.g., newly defined in the 3GPP standard) MAC Control Element (CE) which represents the size of "Msg3" according to (e.g., by using) the amount of bits. In one example, the indication in the "Msg2" may be a new (e.g., new defined in the 3GPP standard) one bit information element which represents a normal size of the "Msg3" or an extended size of the "Msg3".

In one example, the information of the service may include a service type of the service. In one example, the service type may include at least one of a traffic characteristic type (e.g., at least one of an Enhance Mobile Broadband (eMBB), an Ultra Reliable Low Latency Communication (URLLC), an Enhanced Machine Type Communication (eMTC), best effort traffic and a realtime streaming), a network slice identity (ID), a network slice instance ID and information of Qualify of Service (QoS). In one example, the information of the service may further include information of the communication device (e.g., communication related information). That is, the communication device provides both the service type and the information of the communication device to the first node. In one example, the information of the communication device may be generated by the communication device according to a measurement performed before performing the first RA procedure (i.e., Step 302). In one example, the measurement may be performed according to a measurement configuration, which may be transmitted in the system information or transmitted in a NAS indication, may be preconfigured in a SIM or a Universal SIM (USIM), or may be preconfigured by a Public Land Mobile Network (PLMN) where the communication device locates. The measurement may include a cell quality (e.g., a physical cell ID, reference signal receiving power (RSRP), reference signal receiving quality (RSRQ)) of a cell of a plurality of frequencies. In one example, the measurement performed by the communication device in the IDLE/INACTIVE state may be different from the measurement performed by the communication device in a CONNECTED state.

In one example, the information of the communication device may include at least one of radio related information of the communication device, capability information of the communication device and a mobility state of the communication device. In one example, the radio related information may include at least one of a supported Radio Access Technology (RAT), a strongest frequency of at least one cell measured by the communication device, at least one cell ID of the at least one cell, at least one measurement result of the at least one cell and a supported band combination. In one example, the capability information may include at least one of a support of a plurality of RRC connections, a support of a Bandwidth-Limited (BL) communication device and a support of a network slice. In one example, the mobility state may include at least one of a moving speed of the communication device and a trajectory of the communication device.

In one example, the communication device may transmit a RRC redirection response message including the service type to the first one of the at least one second node, in response to the RRC redirection command message. In one example, the RRC redirection response message may be carried in a "Msg5" of the second RA procedure.

In one example, the RRC redirection command message may include at least one of a connection indication (e.g., "conn indication"), a redirection indication, a reserve indication and at least one access information of the at least one second node (e.g., "Node config" and "rach-ConfigDedicated"). For example, each of the at least one access information may be corresponding to each of the at least one second node. In one example, the connection indication may indicate whether the communication device keeps a RRC connection between the communication device and the first node. In one example, the reserve indication may indicate whether the communication device establishes the RRC connection between the communication device and the first node, when all of at least one RA procedure performed with all of the at least one second node are failed. In one example, the at least one access information may include at least one node configuration of the at least one second node and at least one random access parameter (e.g., resource configuration (e.g., "rach-ConfigDedicated")) of the at least one second node. In one example, each of the at least one node configuration may include a physical cell ID (e.g., physCell ID) of each of the at least one second node, a RA parameter (e.g., rach-ConfigComm (e.g., prach-ConfigIndex, preambleInitialReceivedTargetPower, powerRampingStep)), carrier information (e.g., frequency and/or RAT), synchronization information, at least one PLMN and/or a redirection timer. In one example, the communication device may not use one of the at least one access information, when the redirection timer corresponding to one of the at least one second node with the one of the at least one access information is expired. In one example, the RRC redirection command message may be carried in a "Msg4" of the first RA procedure.

In one example, the communication device may keep a first Cell Radio Network Temporary Identifier (C-RNTI) of the first node, if the reserve indication is set. In one example, the communication device may determine a transmission power for transmitting a second RA request message to the first one of the at least one second node in the second RA procedure, after selecting the first one of the at least one second node. In one example, the transmission power may be determined according to a value of "preambleInitialReceivedTargetPower" specified in the 3GPP standard. In one example, the transmission power may be determined according to another transmission power for transmitting the first RA request message. For one example, the transmission power may be same as the other transmission power. For another example, the transmission power may be determined by increasing the other transmission power by one power ramping step (e.g., 0, 2, 4 or 6 dB).

In one example, the communication device may select the first one of the at least one second node according to the RRC redirection command message and a result of a cell search procedure, after performing the cell search procedure. That is, the communication device performs the cell search procedure first, then the communication device select the first one of the at least one second node from the at least one second node (e.g., listed in the RRC redirection command message) according to the result of the cell search procedure, e.g., a priority order generated according to a ranking of a signal quality/strength of the at least one second node. In another example, the communication device may select the first one of the at least one second node according to according to the RRC redirection command message and a measurement performed before performing the first RA procedure. That is, the communication device select the first one of the at least one second node from the at least one second node (e.g., listed in the RRC redirection command message) according to the measurement, i.e., a priority order generated by a ranking of a signal quality/strength of the at least one second node.

In one example, the communication device may perform the second RA procedure with the first one of the at least one second node by transmitting the second RA request message including a second preamble to the first one of the at least one second node, and by receiving a second RA response message from the first one of the at least one second node after transmitting the second RA request message. In one example, the communication device may transmit a plurality of the second RA request message to the first one of the at least one second node before receiving the second RA response message, to ensure a success of transmission of the second RA request message.

In one example, the communication device may keep a second C-RNTI of the first one of the at least one second node and may release the first C-RNTI, if the communication device is capable of keeping a single RRC connection. In one example, the communication device may keep the second C-RNTI and may determine whether to release the first C-RNTI according to the connection indication and a capability of the communication device, if the communication device is capable of keeping a plurality of RRC connections. The communication device may not feed back any message to the first node and may transmit the RRC redirection response message to the first one of the at least one second node, if the connection indication indicates that the communication device keeps the RRC connection between the communication device and the first node but the communication device is not capable of keeping the plurality of RRC connections. In one example, the communication device may release the first C-RNTI according to a timer (e.g., implicitly) or according to an indication transmitted from the first one of the at least one second node (e.g., explicitly).

In one example, the communication device may perform a third RA procedure with a second one of the at least one second node, if the second RA procedure is failed and a RA timer for performing the second RA procedure is not expired. That is, the communication device reselects a next one of the at least one second node and initiates a next RA procedure with the next one of the at least one second node, if the next one of the at least one second node is available and the RA timer is not expired. In one example, the communication device may transmit a RRC Redirection Response message (e.g., RRCRedirectionResponse) to the first node, if the second RA procedure is failed. That is, the communication device does not perform the next RA procedure with the next one of the at least one second node, if the next one of the at least one second node is not available or the timer for performing the second RA procedure is expired.

In one example, the communication device may receive a RRC connection setup message (e.g., RRCConnectionSetup) from the first node, after transmitting the RRC message (e.g., RRCConnectionRequest) including the information of the service to the first node. That is, the communication device is connected with the first node and is not directed to any one of the at least one second node.

Figure 4:
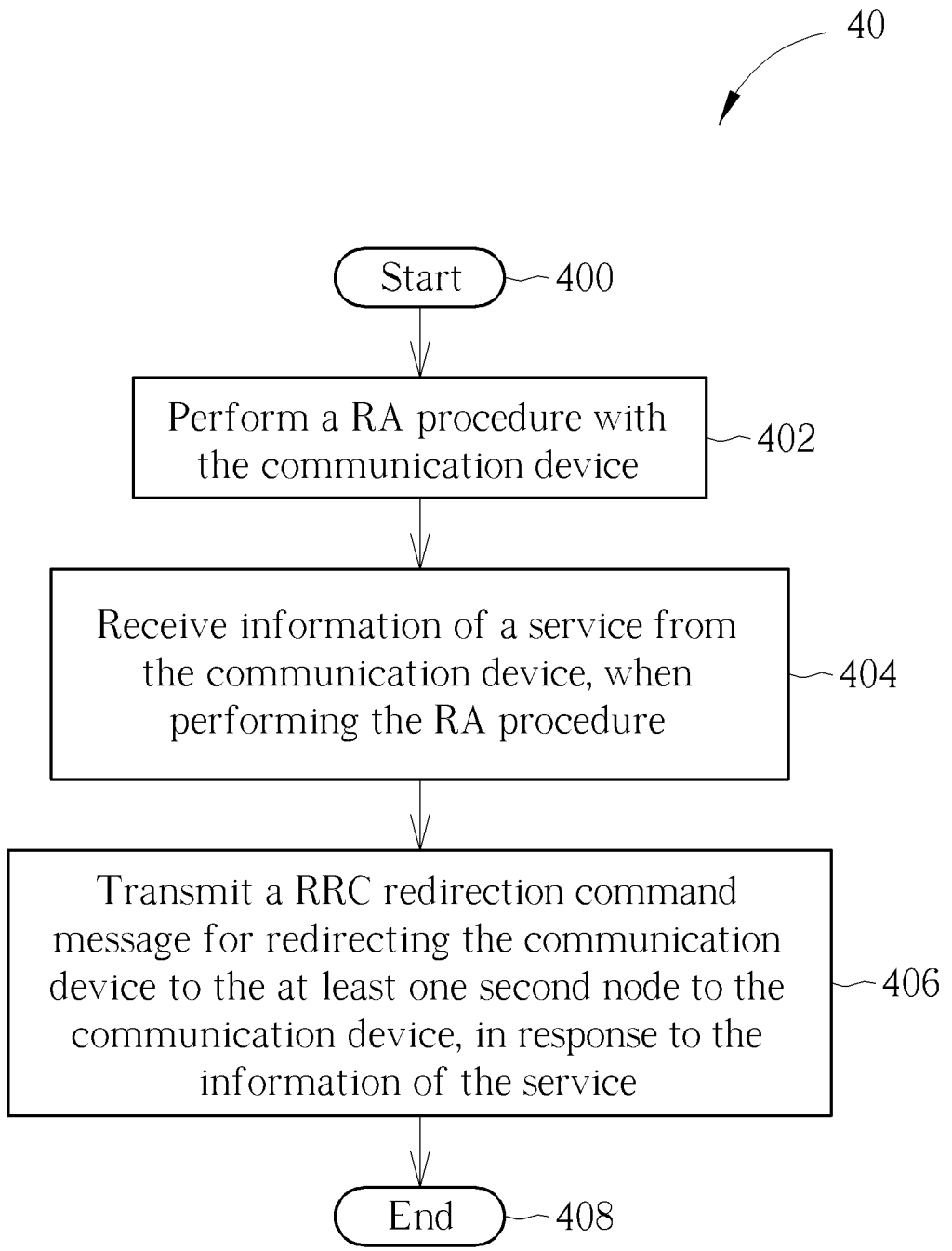
FIG. 4 is a flowchart of a process according to an example of the present invention.

FIG. 4 is a flowchart of a process 40 according to an example of the present invention. The process 40 may be utilized in a first node (e.g., of a network shown in FIG. 1), to redirect a communication device. The process 40 may be compiled into the program code 214 and includes the following steps:

Step 400: Start.

Step 402: Perform a RA procedure with the communication device.

Step 404: Receive information of a service from the communication device, when performing the RA procedure.

Step 406: Transmit a RRC redirection command message for redirecting the communication device to the at least one second node to the communication device, in response to the information of the service.

Step 408: End.

According to the process 40, the first node may perform a RA procedure with the communication device. The first node may receive information of a service from the communication device, when performing the RA procedure. The first node may transmit a RRC redirection command message (e.g., RRCRedirectionCommand) for redirecting the communication device to the at least one second node to the communication device, in response to the information of the service. That is, the communication device is redirected from the first node to the at least one second node during the RA procedure. Thus, the communication device may establish a second connection to the first one of the at least one second node without establishing a first connection with the first node (e.g., is rejected by the first node), or executing a handover command received from the first node for communicating with the first one of the at least one second node after establishing the first connection with the first node. As a result, connections between the communication device and the nodes can be established efficiently and resources for establishing the connections can be saved.

Realization of the process 40 is not limited to the above description. The following examples may be applied for realizing the process 40.

In one example, the first node may select at least one node according to the information of the service and information of network. Then, the first node may determine (e.g., select) at least one second node of the at least one node from the at least one node In one example, the first node may perform the RA procedure with the communication device by receiving a RA request message (e.g., a "Msg1") including a preamble from the communication device and transmitting a RA response message (e.g., a "Msg2") to the communication device, after receiving the RA request message.

In one example, the information of the service may be received in a RRC message (e.g., RRCConnectionRequest) from the communication device. In one example, the RRC message may be carried in a "Msg3" of the RA procedure. In one example, the information of the service may be received from the communication device via a random access resource (e.g., time/frequency resource(s), preamble(s)). In one example, the random access resource may be carried in a "Msg1" of the RA procedure.

In one example, the information of the service may include a service type of the service. In one example, the service type may include at least one of a traffic characteristic type (e.g., at least one of an eMBB, an URLLC, an eMTC, best effort traffic and a realtime streaming), a network slice ID, a network slice instance ID and information of QoS. In one example, the information of the service may further include information of the communication device. In one example, the information of the communication device may include at least one of radio related information of the communication device, capability information of the communication device and a mobility state of the communication device. In one example, the radio related information may include at least one of a supported RAT, a strongest frequency of at least one cell measured by the communication device, at least one cell ID of the at least one cell, at least one measurement result of the at least one cell and a supported band combination. In one example, the capability information may include at least one of a support of a plurality of RRC connections, a support of a BL communication device and a support of a network slice. In one example, the mobility state may include at least one of a moving speed of the communication device and a trajectory of the communication device.

In one example, the information of the network may include information of the at least one node nearing (e.g., neighboring) the first node. In one example, the information of the network may include a topology (e.g., of a RAN) of the at least one cell of the at least one node (e.g., macro/micro cell deployment of the at least one cell of the at least one node, with/without direct interface(s) with the at least one cell of the at least one node), at least one physical cell ID or cell ID of the at least one cell of the at least one node, at least one carrier frequency and/or RAT and/or cell size of the at least one cell of the at least one node, at least one capability (e.g., supported service type, supported dedicated network function, supported network slice and/or supported network instance) of the at least one cell of the at least one node.

In one example, the first node may determine the at least one second node of the at least one node from the at least one node by transmitting at least one node request message including the service type to the at least one node, and by receiving at least one node response message including at least one access information of the at least one second node from the at least one second node. In one example, the first node may receive at least one node reject message from the at least one second node, after transmitting the at least one node request message including the service type to the at least one node. That is, the at least one second node may be busy, dedicated resources exhausted and/or service barred temporarily.

In one example, the at least one access information may include at least one node configuration of the at least one second node and at least one random access parameter (e.g., resource configuration (e.g., "rach-ConfigDedicated")) of the at least one second node. In one example, the at least one random access parameter may be contention free. In one example, each of the at least one node configuration may include a physical cell ID (e.g., physCell ID) of each of the at least one second node, a RA parameter (e.g., rach-ConfigComm (e.g., prach-ConfigIndex, preambleInitialReceivedTargetPower, powerRampingStep)), carrier information (e.g., frequency and/or RAT), synchronization information, at least one PLMN and/or a redirection timer. In one example, the communication device may not use one of the at least one access information, when the redirection timer corresponding to one of the at least one second node with the one of the at least one access information is expired.

In one example, the RRC redirection command message may include at least one of a connection indication, a redirection indication, a reserve indication and the at least one access information (e.g., "Node config" and "rack-ConfigDedicated"). In one example, the connection indication may indicate whether the communication device keeps a RRC connection between the communication device and the first node. In one example, the reserve indication may indicate whether the communication device establishes the RRC connection between the communication device and the first node, when all of at least one RA procedure performed with all of the at least one second node are failed. In one example, the at least one access information may include at least one node configuration of the at least one second node and at least one random access parameter (e.g., resource configuration (e.g., "rach-ConfigDedicated")) of the at least one second node. In one example, the first node may transmit the RRC redirection command message in a "Msg4" of the first RA procedure.

In one example, the first node may receive a RRC redirection response message including null information from the communication device, after transmitting the RRC redirection command to the communication device. In one example, the first node may receive a RRC redirection response message including the service type from the communication device, after transmitting the RRC redirection command to the communication device. Then, the first node may transmit an initial communication message including the service type to a CN (e.g., a control panel (CP) Anchor), and may transmit at least one node release message for releasing the at least one second node to the at least one second node. In one example, the first node may receive the RRC redirection response message in a "Msg5" of the second RA procedure.

In one example, the first node may transmit a RRC connection setup message (e.g., RRCConnectionSetup) to the communication device, after receiving the at least one node reject message from the at least one second node. Then, the first node may receive a RRC connection setup complete message (e.g., RRCConnectionSetupComplete) including the service type from the communication device. The RRC connection setup message may be carried in a "Msg4", and the RRC connection setup complete message may be carried in a "Msg5" of the second RA procedure.

In one example, the first node may release the first C-RNT1 according to a timer or an indication transmitted by the first one of the at least one second node, after transmitting the RRC redirection command message to the communication device.

Figure 5:
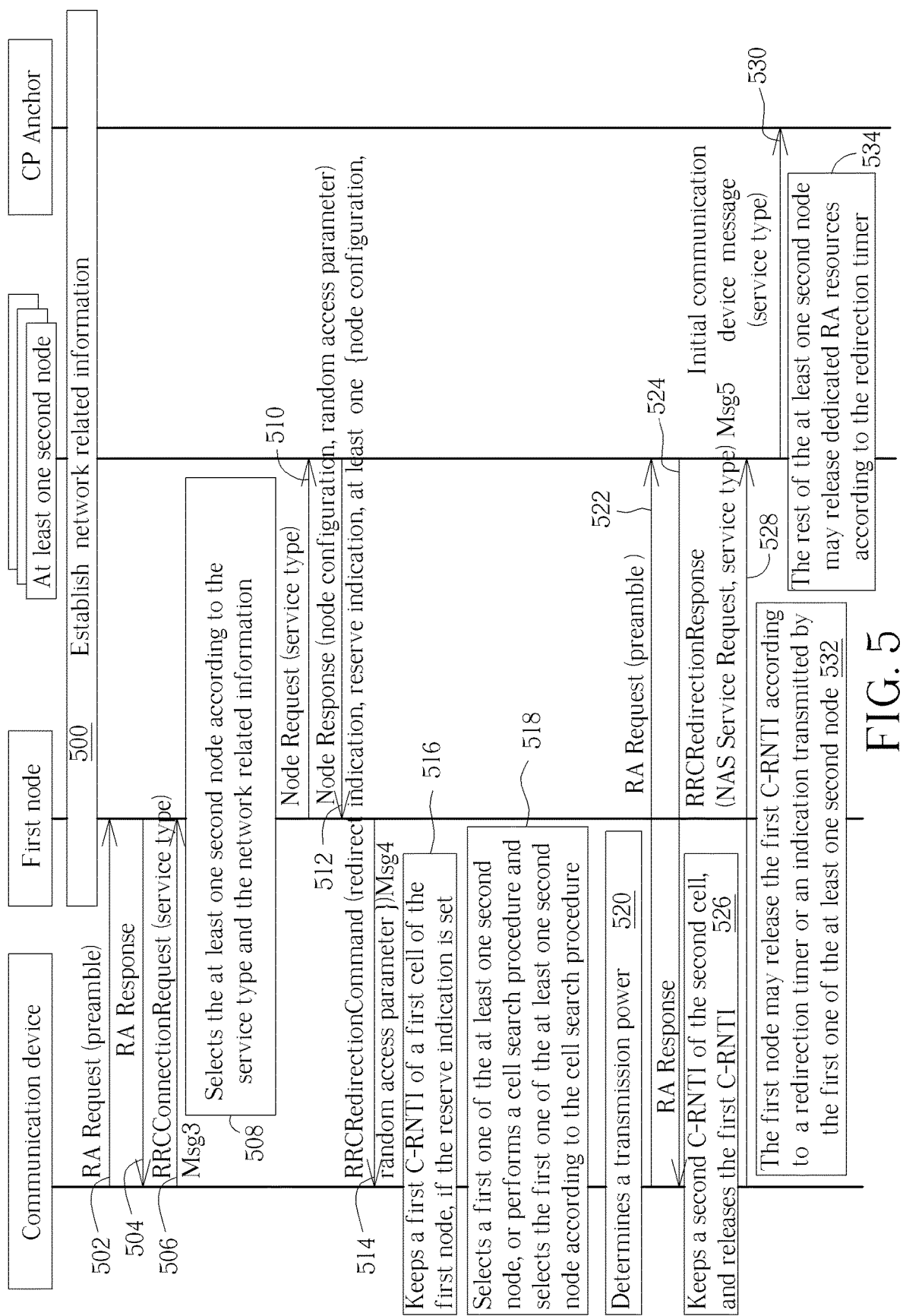
FIG. 5 is a schematic flowchart of redirecting a communication device according to an example of the present example.

FIG. 5 is a schematic flowchart of redirecting a communication device according to an example of the present example. At step 500, a first node establishes (e.g., exchanges) network related information with at least one second node and a CP Anchor, e.g., by messages exchanged with the at least one second node and the CP Anchor, by configuration configured by the CN, by report(s) received from the communication device. At step 502, the communication device initiates a first RA procedure by transmitting a first RA request including a first preamble to the first node. At step 504, the communication device receives a first RA response message from the first node. At step 506, the communication device transmits a RRCConnectionRequest message (Msg3) including a service type to the first node. At step 508, the first node selects the at least one second node according to the service type and the network related information. At step 510, the first node transmits at least one node request message including the service type to the at least one second node. At step 512, the first node receives at least one node response message including at least one node configuration of the at least one second node and random access parameter of the at least one second node from the at least one second node. At step 514, the first node transmits a RRCRedirectionCommand message (Msg4) including a redirection indication, a reserve indication and the at least one node configuration and the random access parameter to the communication device.

At step 516, the communication device keeps a first C-RNTI the first node, because the reserve indication is set. At step 518, the communication device selects a first one of the at least one second node (e.g., blind addition). Alternatively, the communication device performs a cell search procedure and selects the first one of the at least one second node according to (e.g., a result of) the cell search procedure. At step 520, the communication device determines the transmission power for transmitting the second RA request to the first one of the at least one second node. At step 522, the communication device initiates a second RA procedure by transmitting the second RA request including a second preamble to the first one of the at least one second node. At step 524, the communication device receives a second RA response message from the first one of the at least one second node.

At step 526, the communication device keeps a second C-RNTI of the first one of the at least one second node, and releases the first C-RNTI. At step 528, the communication device transmits a RRCRedirectionResponse message (Msg5) including a NAS service request and the service type to the first one of the at least one second node. At step 530, the first one of the at least one second node transmits an initial communication device message including the service type to the CP Anchor. At step 532, the first node may release the first C-RNT1 according to a redirection timer or an indication transmitted by the first one of the at least one second node. At step 534, the rest of the at least one second node (i.e., the first one of the at least one second node is not included) may release dedicated RA resources according to the redirection timer.

Figure 6:
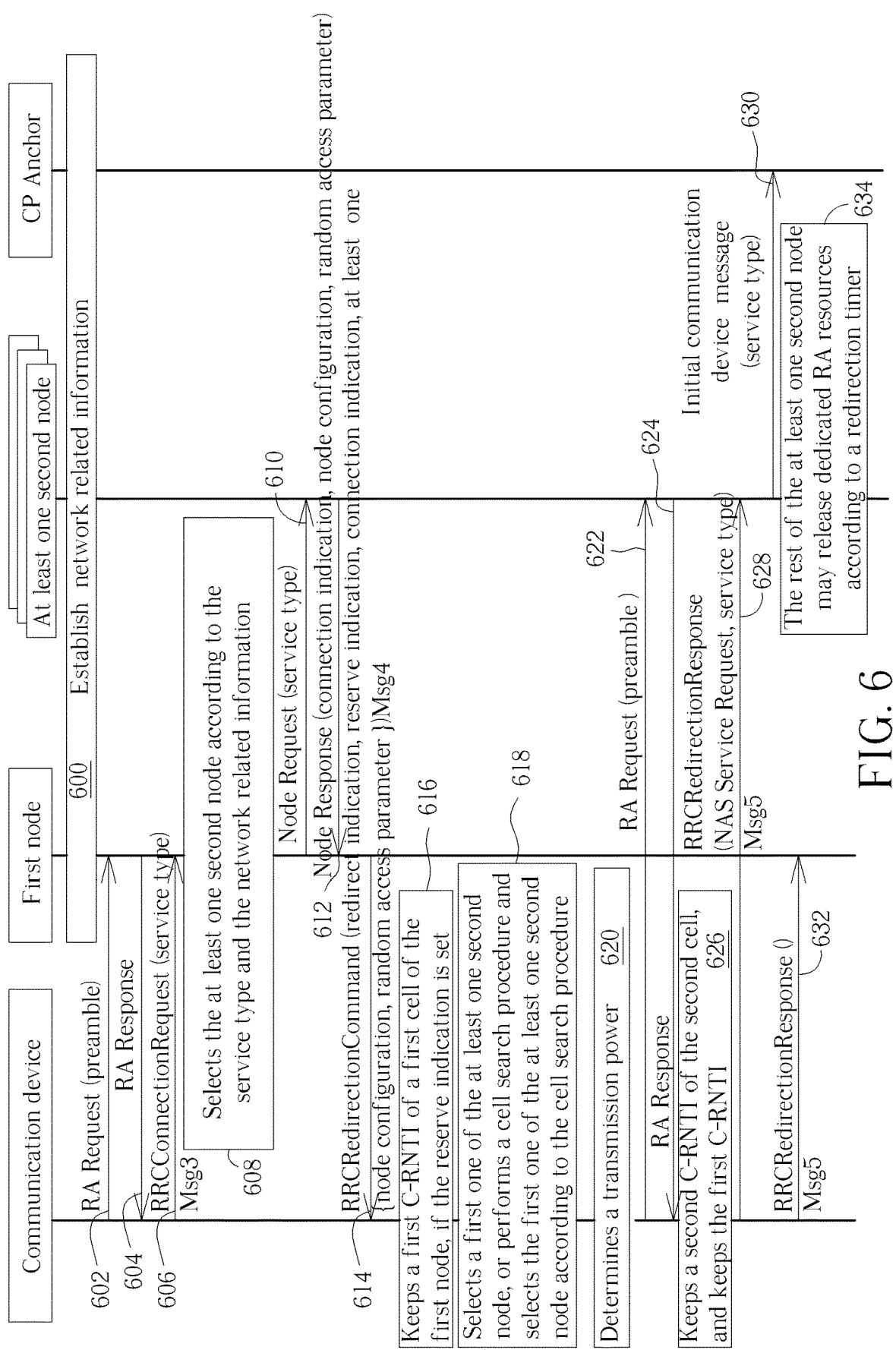
FIG. 6 is a schematic flowchart of redirecting a communication device according to an example of the present example.

FIG. 6 is a schematic flowchart of redirecting a communication device according to an example of the present example. At step 600, a first node establishes (e.g., exchanges) network related information with at least one second node and a CP Anchor. At step 602, the communication device initiates a first RA procedure by transmitting a first RA request including a first preamble to the first node. At step 604, the communication device receives a first RA response message from the first node. At step 606, the communication device transmits a RRCConnectionRequest message (Msg3) including a service type to the first node. At step 608, the first node selects the at least one second node according to the service type and the network related information. At step 610, the first node transmits at least one node request message including the service type to the at least one second node. At step 612, the first node receives at least one node response message including a connection indication, at least one node configuration of the at least one second node and at least one random access parameter of the at least one second node from the at least one second node. At step 614, the first node transmits a RRCRedirectionCommand message (Msg4) including a redirection indication, a reserve indication, the connection indication, the at least one node configuration and the at least one random access parameter to the communication device.

At step 616, the communication device keeps a first C-RNTI the first node, because the reserve indication is set. At step 618, the communication device selects a first one of the at least one second node. Alternatively, the communication device performs a cell search procedure and selects the first one of the at least one second node according to (e.g., a result of) the cell search procedure. At step 620, the communication device determines the transmission power for transmitting the second RA request to the first one of the at least one second node. At step 622, the communication device initiates a second RA procedure by transmitting the second RA request including a second preamble to the first one of the at least one second node. At step 624, the communication device receives a second RA response message from the first one of the at least one second node.

At step 626, the communication device keeps a second C-RNTI of the second cell of the first one of the at least one second node, and keeps the first C-RNTI, because the connection indication indicates that the communication device keeps the RRC connection with the first node and the communication device is capable of keeping a plurality of RRC connections. At step 628, the communication device transmits a first RRCRedirectionResponse message (Msg5) including a NAS service request and the service type to the first one of the at least one second node. At step 630, the first one of the at least one second node transmits an initial communication device message including the service type to the CP Anchor. At step 632, the communication device transmits a second RRCRedirectionResponse message (Msg5) including null information to the first node. At step 634, the rest of the at least one second node (i.e., the first one of the at least one second node is not included) may release dedicated RA resources according to a redirection timer.

Figure 7:
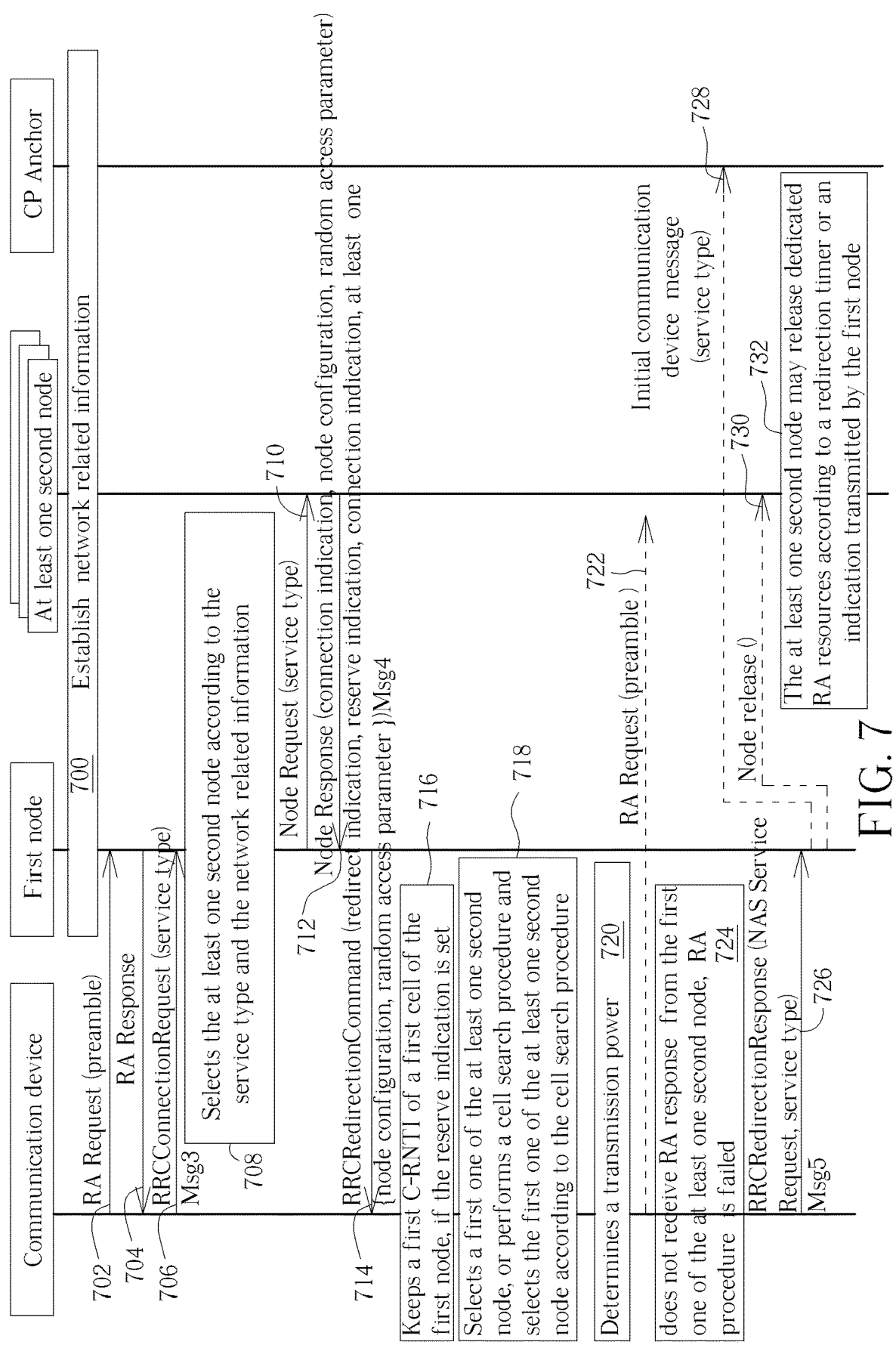
FIG. 7 is a schematic flowchart of redirecting a communication device according to an example of the present example.

FIG. 7 is a schematic flowchart of redirecting a communication device according to an example of the present example. At step 700, a first node establishes (e.g., exchanges) network related information with at least one second node and a CP Anchor. At step 702, the communication device initiates a first RA procedure by transmitting a first RA request including a first preamble to the first node. At step 704, the communication device receives a first RA response message from the first node. At step 706, the communication device transmits a RRCConnectionRequest message (Msg3) including a service type to the first node. At step 708, the first node selects the at least one second node according to the service type and the network related information. At step 710, the first node transmits at least one node request message including the service type to the at least one second node. At step 712, the first node receives at least one node response message including a connection indication, at least one node configuration of the at least one second node and at least one random access parameter of the at least one second node from the at least one second node. At step 714, the first node transmits a RRCRedirectionCommand message (Msg4) including a redirection indication, a reserve indication, the connection indication and the at least one node configuration and the at least one random access parameter to the communication device.

At step 716, the communication device keeps a first C-RNTI the first node, because the reserve indication is set. At step 718, the communication device selects a first one of the at least one second node. Alternatively, the communication device performs a cell search procedure and selects the first one of the at least one second node according to (e.g., a result of) the cell search procedure. At step 720, the communication device determines the transmission power for transmitting the second RA request to the first one of the at least one second node. At step 722, the communication device initiates a second RA procedure by transmitting the second RA request including a second preamble to the first one of the at least one second node. At step 724, the communication device does not receive a second RA response message from the first one of the at least one second node. That is, the second RA procedure performed with the first one of the at least one second node is failed.

At step 726, the communication device transmits a RRCRedirectionResponse message (Msg5) including the service type and a NAS service request to the first node, if a next one of the at least one second node is not available or a RA timer for performing the second RA procedure is expired. At step 728, the first node transmits an initial communication device message including the service type to the CP Anchor. At step 730, the first node transmits at least one node release message to the at least one second node. At step 732, the at least one second node may release dedicated RA resources according to a redirection timer or an indication transmitted by the first node.

Alternatively, at step 726, the communication device may re-perform steps 718-722 with the next one of the at least one second node (i.e., selects the next one of the at least one second node and initiates a next RA procedure with the next one of the at least one second node) until the next RA procedure is performed successfully (i.e., receives a next RA response message), if the next one of the at least one second node is available and the RA timer is not expired. Then, the communication device may communicate with the next one of the at least one second node according to steps 526-534 or 626-634.

Figure 8:
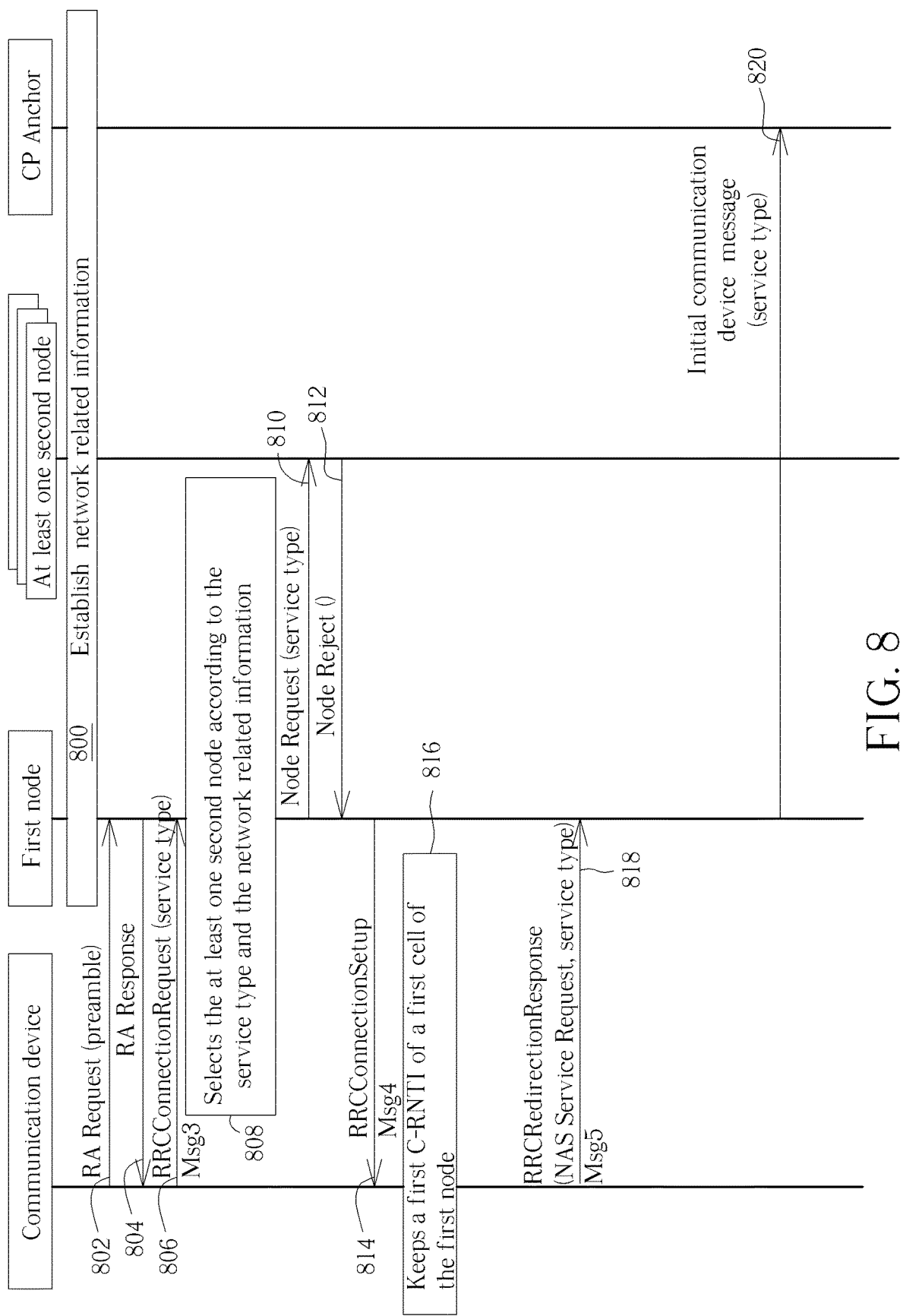
FIG. 8 is a schematic flowchart of redirecting a communication device according to an example of the present example.

FIG. 8 is a schematic flowchart of redirecting a communication device according to an example of the present example. At step 800, a first node establishes (e.g., exchanges) network related information with at least one second node and a CP Anchor. At step 802, the communication device initiates a first RA procedure by transmitting a first RA request including a first preamble to the first node. At step 804, the communication device receives a first RA response message from the first node. At step 806, the communication device transmits a RRCConnectionRequest message (Msg3) including a service type to the first node. At step 808, the first node selects the at least one second node according to the service type and the network related information. At step 810, the first node transmits at least one node request message including the service type to the at least one second node. At step 812, the first node receives at least one node reject message from all of the at least one second node. At step 814, the first node transmits a RRCConnectionSetup message (Msg4) to the communication device.

At step 816, the communication device keeps a first C-RNTI the first node. At step 818, the communication device transmits a RRCConnectionSetupComplete message (Msg5) including a NAS service request and the service type to the first node. At step 820, the first node transmits an initial communication device message including the service type to the CP Anchor.

Figure 9:
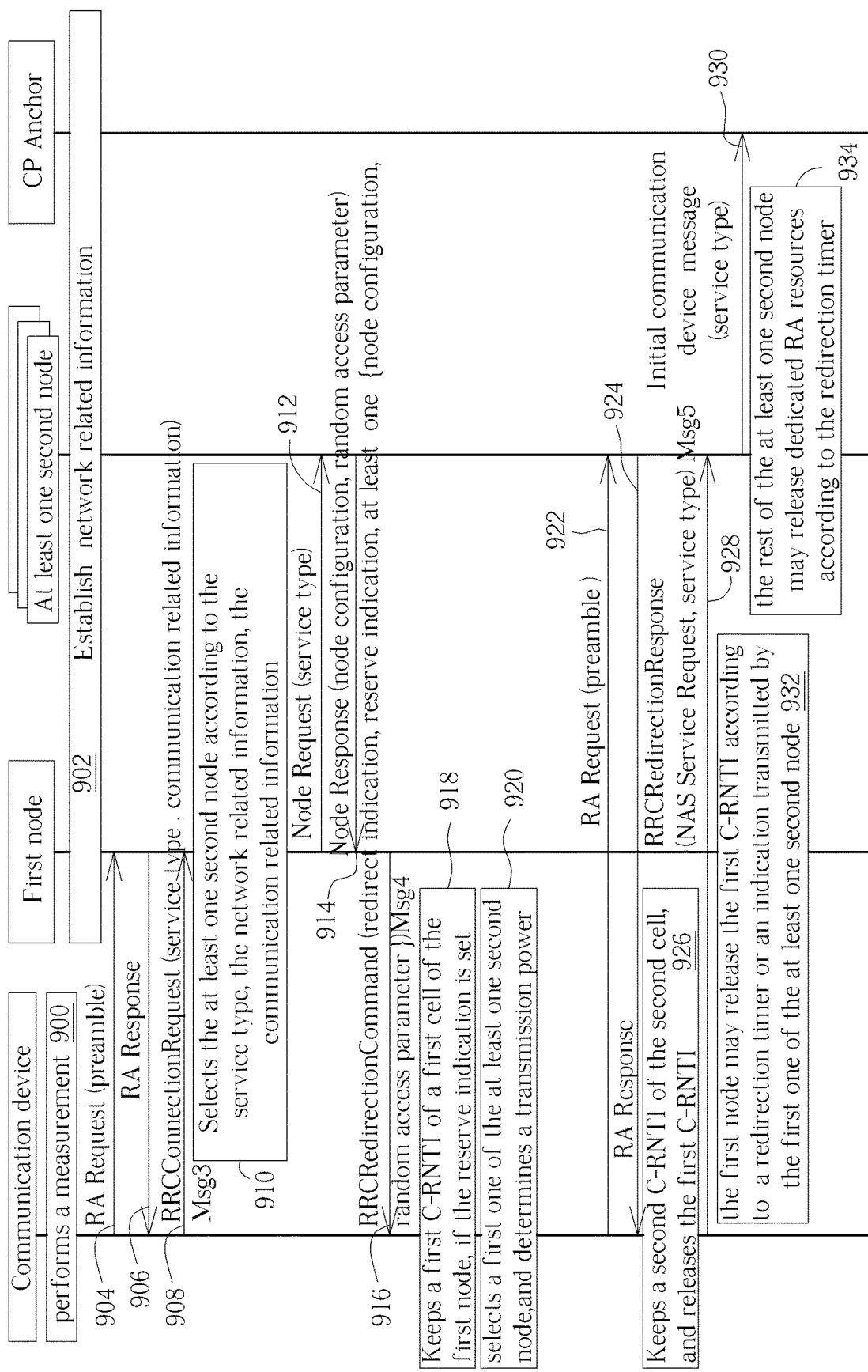
FIG. 9 is a schematic flowchart of redirecting a communication device according to an example of the present example.

FIG. 9 is a schematic flowchart of redirecting a communication device according to an example of the present example. At step 900, the communication device performs a measurement. At step 902, a first node establishes (e.g., exchanges) network related information with at least one second node and a CP Anchor. At step 904, the communication device initiates a first RA procedure by transmitting a first RA request including a first preamble to the first node. At step 906, the communication device receives a first RA response message from the first node. At step 908, the communication device transmits a RRCConnectionRequest message (Msg3) including a service type and communication related information to the first node. At step 910, the first node selects the at least one second node according to the service type, the network related information and the communication related information. At step 912, the first node transmits at least one node request message including the service type to the at least one second node. At step 914, the first node receives at least one node response message including at least one node configuration and random access parameter of the at least one second node from the at least one second node.

At step 916, the first node transmits a RRCRedirectionCommand message (Msg4) including a redirection indication, a reserve indication and the at least one node configuration of the at least one second node and the random access parameter of the at least one second node to the communication device. At step 918, the communication device keeps a first C-RNTI of the first node, because the reserve indication is set. At step 920, the communication device selects a first one of the at least one second node, and determines a transmission power for transmitting a second RA request to the first one of the at least one second node. At step 922, the communication device initiates a second RA procedure by transmitting the second RA request including a second preamble to the first one of the at least one second node.

At step 924, the communication device receives a second RA response message from the first one of the at least one second node. At step 926, the communication device keeps a second C-RNTI of the second cell of the first one of the at least one second node, and releases the first C-RNTI. At step 928, the communication device transmits a RRCRedirectionResponse message (Msg5) including a NAS service request and the service type to the first one of the at least one second node. At step 930, the first one of the at least one second node transmits an initial communication device message including the service type to the CP Anchor. At step 932, the first node may release the first C-RNT1 according to a redirection timer for performing the first RA procedure or an indication transmitted by the first one of the at least one second node. At step 934, the rest of the at least one second node (i.e., the first one of the at least one second node is not included) may release dedicated RA resources according to the redirection timer.

Figure 10:
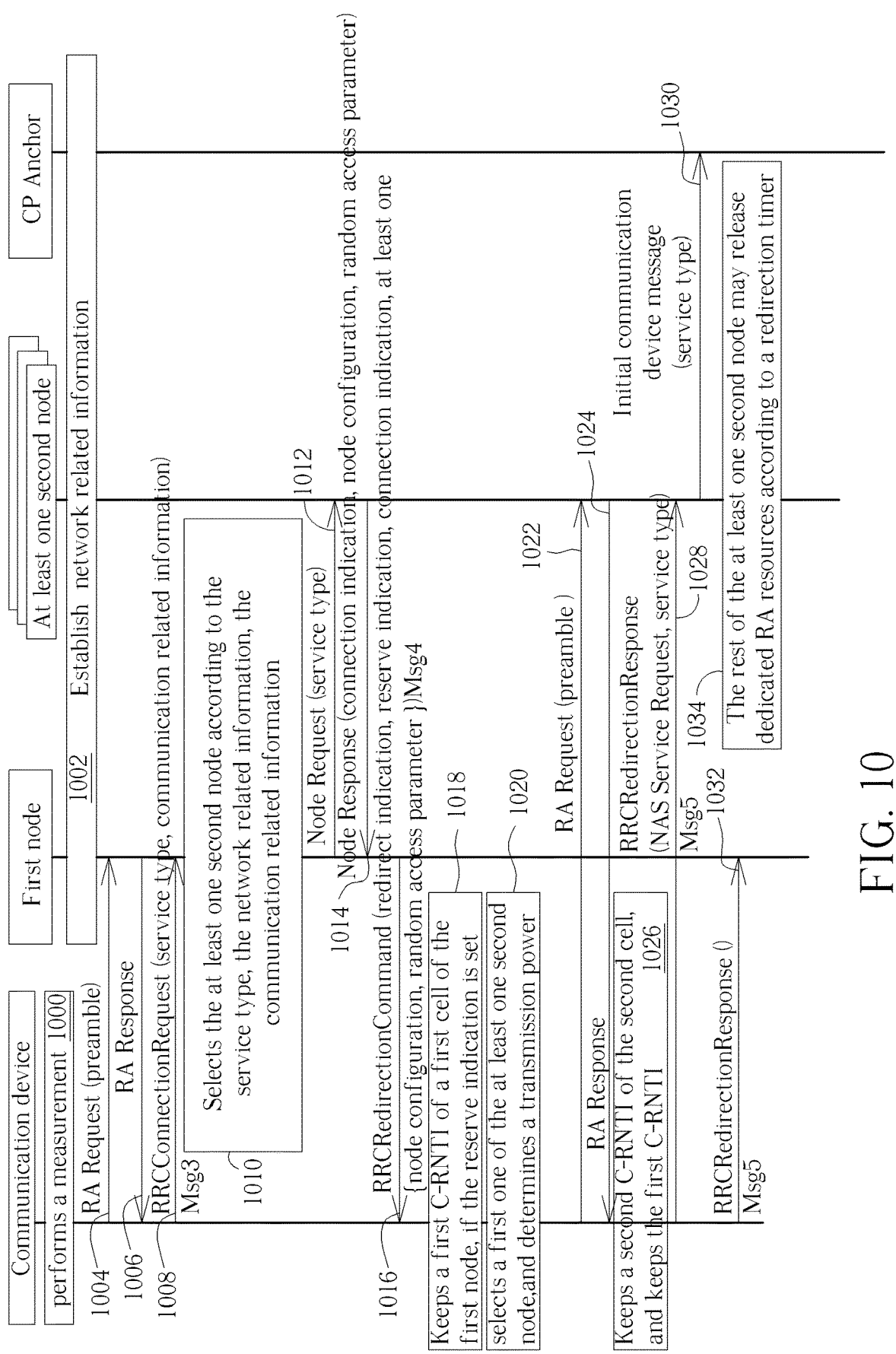
FIG. 10 is a schematic flowchart of redirecting a communication device according to an example of the present example.

FIG. 10 is a schematic flowchart of redirecting a communication device according to an example of the present example. At step 1000, the communication device performs a measurement. At step 1002, a first node establishes (e.g., exchanges) network related information with at least one second node and a CP Anchor. At step 1004, the communication device initiates a first RA procedure by transmitting a first RA request including a first preamble to the first node. At step 1006, the communication device receives a first RA response message from the first node. At step 1008, the communication device transmits a RRCConnectionRequest message (Msg3) including a service type and communication related information to the first node. At step 1010, the first node selects the at least one second node according to the service type, the network related information and the communication related information. At step 1012, the first node transmits at least one node request message including the service type to the at least one second node. At step 1014, the first node receives at least one node response message including a connection indication, at least one node configuration of the at least one second node and at least one random access parameter of the at least one second node from the at least one second node.

At step 1016, the first node transmits a RRCRedirectionCommand message (Msg4) including a redirection indication, a reserve indication, the connection indication and the at least one node configuration and the at least one random access parameter to the communication device. At step 1018, the communication device keeps a first C-RNTI of the first node, because the reserve indication is set. At step 1020, the communication device selects a first one of the at least one second node, and determines a transmission power for transmitting a second RA request to the first one of the at least one second node. At step 1022, the communication device initiates a second RA procedure by transmitting the second RA request including a second preamble to the first one of the at least one second node.

At step 1024, the communication device receives a second RA response message from the first one of the at least one second node. At step 1026, the communication device keeps a second C-RNTI of the second cell of the first one of the at least one second node, and keeps the first C-RNTI, if the connection indication indicates that the communication device keeps the RRC connection with the first node and the communication device is capable of keeping a plurality of RRC connections. At step 1028, the communication device transmits a first RRCRedirectionResponse message (Msg5) including a NAS service request and the service type to the first one of the at least one second node. At step 1030, the first one of the at least one second node transmits an initial communication device message including the service type to the CP Anchor. At step 1032, the communication device transmits a second RRCRedirectionResponse message (Msg5) including null information to the first node. At step 1034, the rest of the at least one second node (i.e., the first one of the at least one second node is not included) may release dedicated RA resources according to a redirection timer.

Figure 11:
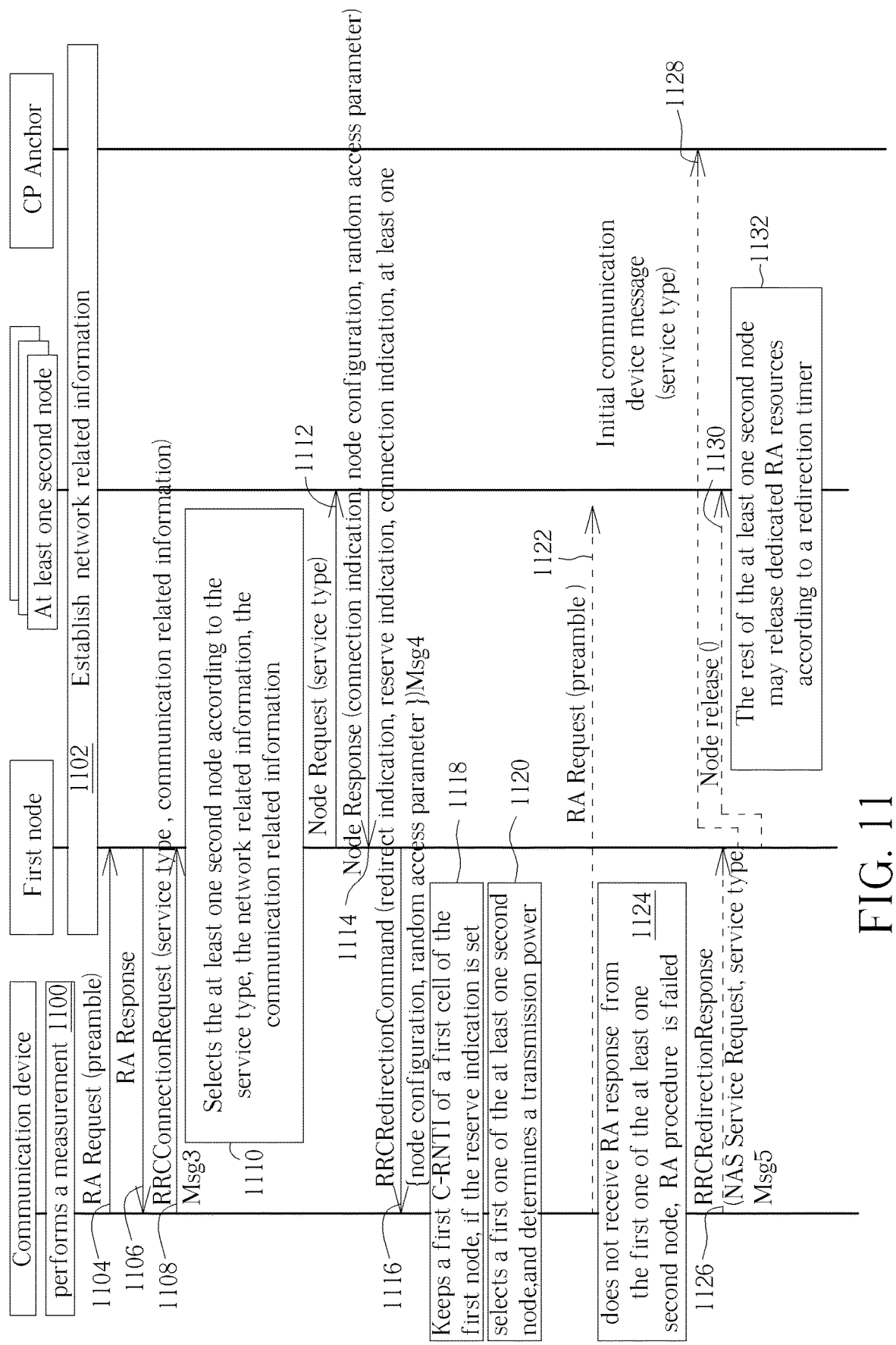
FIG. 11 is a schematic flowchart of redirecting a communication device according to an example of the present example.

FIG. 11 is a schematic flowchart of redirecting a communication device according to an example of the present example. At step 1100, the communication device performs a measurement. At step 1102, a first node establishes (e.g., exchanges) network related information with at least one second node and a CP Anchor. At step 1104, the communication device initiates a first RA procedure by transmitting a first RA request including a first preamble to the first node. At step 1106, the communication device receives a first RA response message from the first node. At step 1108, the communication device transmits a RRCConnectionRequest message (Msg3) including a service type and communication related information to the first node. At step 1110, the first node selects the at least one second node according to the service type, the network related information and the communication related information. At step 1112, the first node transmits at least one node request message including the service type to the at least one second node. At step 1114, the first node receives at least one node response message including a connection indication, at least one node configuration of the at least one second node and at least one random access parameter of the at least one second node from the at least one second node.

At step 1116, the first node transmits a RRCRedirectionCommand message (Msg4) including a redirection indication, a reserve indication, the connection indication and the at least one node configuration and the at least one random access parameter to the communication device. At step 1118, the communication device keeps a first C-RNTI of the first node, because the reserve indication is set. At step 1120, the communication device selects a first one of the at least one second node, and determines a transmission power for transmitting a second RA request to the first one of the at least one second node. At step 1122, the communication device initiates a second RA procedure by transmitting the second RA request including a second preamble to the first one of the at least one second node.

At step 1124, the communication device does not receive a second RA response message from the first one of the at least one second node. That is, the second RA procedure performed with the first one of the at least one second node is failed. At step 1126, the communication device transmits a RRCRedirectionResponse message (Msg5) including a NAS service request and the service type to the first node, if a next one of the at least one second node is not available or a RA timer for performing the second RA procedure is expired. At step 1128, the first node transmits an initial communication device message including the service type to the CP Anchor. At step 1130, the first node transmits at least one node release message to the at least one second node. At step 1132, the at least one second node may release dedicated RA resources according to a redirection timer or an indication transmitted by the first node.

Alternatively, at step 1126, the communication device may re-perform steps 1120-1122 with the next one of the at least one second node (i.e., selects the next one of the at least one second node and initiates a next RA procedure with the next one of the at least one second node) until the next RA procedure is performed successfully (i.e., receives a next RA response message), if the next one of the at least one second node is available and the timer is not expired. Then, the communication device may communicate with the next one of the at least one second node according to steps 926-934 or 1026-1034.

Figure 12:
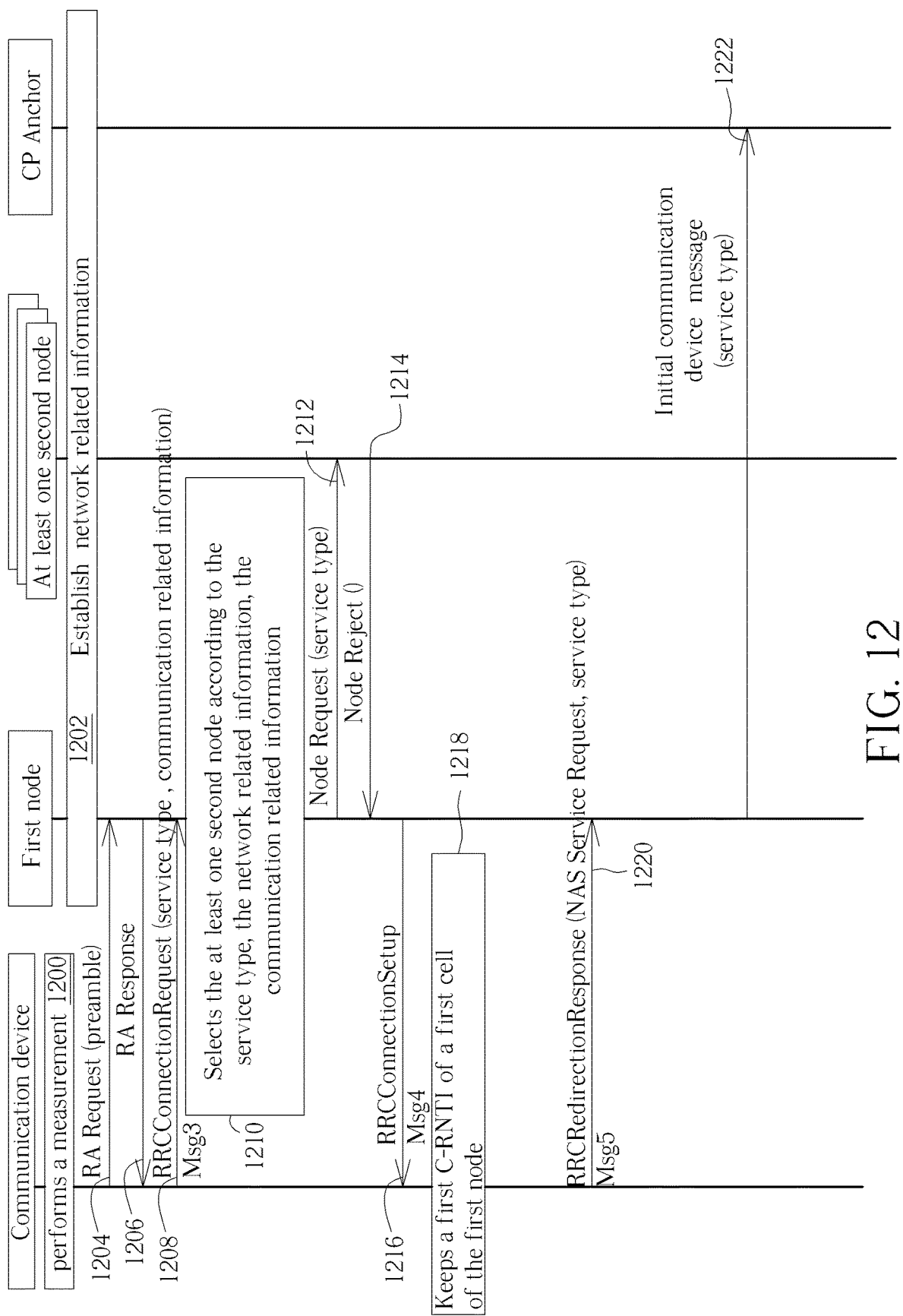
FIG. 12 is a schematic flowchart of redirecting a communication device according to an example of the present example.

FIG. 12 is a schematic flowchart of redirecting a communication device according to an example of the present example. At step 1200, the communication device performs a measurement. At step 1202, a first node establishes (e.g., exchanges) network related information with at least one second node and a CP Anchor. At step 1204, the communication device initiates a first RA procedure by transmitting a first RA request including a first preamble to the first node. At step 1206, the communication device receives a first RA response message from the first node. At step 1208, the communication device transmits a RRCConnectionRequest message (Msg3) including a service type and communication related information to the first node. At step 1210, the first node selects the at least one second node according to the service type, the network related information and the communication related information. At step 1212, the first node transmits at least one node request message including the service type to the at least one second node. At step 1214, the first node receives at least one node reject message from all of the at least one second node.

At step 1216, the first node transmits a RRCConnectionSetup message (Msg4) to the communication device. At step 1218, the communication device keeps a first C-RNTI of the first node. At step 1220, the communication device transmits a RRCConnectionSetupComplete message (Msg5) including a NAS service request and the service type to the first node. At step 1222, the first node transmits an initial communication device message including the service type to the CP Anchor.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related communication device for redirecting the communication device. Accordingly, the communication device is redirected from a node to another node during a RA procedure. As a result, connections between the communication device and the nodes can be established efficiently and resources for establishing the connections can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for redirecting the communication device, comprising:
a storage device; and
a processing circuit, coupled to the storage device, wherein the storage device stores, and the processing circuit is configured to execute instructions of:
performing a first random access (RA) procedure with a first node;
transmitting information of a service to the first node, when performing the first RA procedure, wherein the information of the service comprises a service type of the service;
receiving a radio resource control (RRC) redirection command message for redirecting the communication device to at least one second node from the first node, after transmitting the information of the service;
selecting a first one of the at least one second node according to the RRC redirection command message;
performing a second RA procedure with the first one of the at least one second node; and
transmitting a RRC redirection response message comprising the service type to the first one of the at least one second node, in response to the RRC redirection command message;
wherein the communication device selects the first one of the at least one second node according to a result of a cell search procedure performed by the communication device, after performing the cell search procedure; or selects the first one of the at least one second node according to a measurement performed before performing the first RA procedure;
wherein the information of the service is transmitted in a RRC message to the first node.

2. The communication device of claim 1, wherein the instruction of performing the first RA procedure with the first node comprises:
  transmitting a RA request message comprising a preamble to the first node; and
  receiving a RA response message from the first node, after transmitting the RA request message.

3. The communication device of claim 1, wherein the information of the service is transmitted to the first node via a random access resource.

4. The communication device of claim 1, wherein the service type comprises at least one of a traffic characteristic type, a network slice identity (ID), a network slice instance ID and information of Qualify of Service (QoS).

5. The communication device of claim 4, wherein the traffic characteristic type comprises at least one of an Enhance Mobile Broadband (eMBB), an Ultra Reliable Low Latency Communication (URLLC), an Enhanced Machine Type Communication (eMTC), best effort traffic and a realtime streaming.

6. The communication device of claim 1, wherein the RRC redirection command message comprises at least one of a connection indication, a redirection indication, a reserve indication and at least one access information of the at least one second node.

7. The communication device of claim 6, wherein the connection indication indicates whether the communication device keeps a RRC connection between the communication device and the first node.

8. The communication device of claim 6, wherein the reserve indication indicates whether the communication device establishes a RRC connection between the communication device and the first node, when all of at least one RA procedure performed with all of the at least one second node are failed.

9. The communication device of claim 6, wherein the at least one access information comprises at least one node configuration of the at least one second node and at least one random access parameter of the at least one second node.

10. The communication device of claim 1, wherein the instructions further comprise:
  performing a third RA procedure with a second one of the at least one second node, if the second RA procedure is failed and a RA timer is not expired.

11. A first node for redirecting a communication device, comprising:
  a storage device; and
  a processing circuit, coupled to the storage device, wherein the storage device stores, and the processing circuit is configured to execute instructions of:
  performing a random access (RA) procedure with the communication device;
  receiving information of a service from the communication device, when performing the RA procedure, wherein the information of the service comprises a service type of the service; and
  transmitting a radio resource control (RRC) redirection command message for redirecting the communication device to the at least one second node and for the communication device to select one of the at least one second node to the communication device, in response to the information of the service, wherein the communication device selects the one of the at least one second node according to a result of a cell search procedure performed by the communication device, after performing the cell search procedure; or selects the one of the at least one second node according to a measurement performed before performing the RA procedure;
  wherein the information of the service is received in a RRC message from the communication device;
  wherein the one of the at least one second node receives a RRC redirection response message comprising the service type from the communication device, in response to the RRC redirection command message.

12. The first node of claim 11, wherein the instruction of performing the RA procedure with the communication device comprising:
  receiving a RA request message comprising a preamble from the communication device; and
  transmitting a RA response message to the communication device, after receiving the RA request message.

13. The first node claim 11, wherein the information of the service is received from the communication device a via a random access resource.

14. The first node of claim 11, wherein the service type comprises at least one of a traffic characteristic type, a network slice identity (ID), a network slice instance ID and information of Qualify of Service (QoS).

15. The first node of claim 14, wherein the traffic characteristic type comprises at least one of an Enhance Mobile Broadband (eMBB), an Ultra Reliable Low Latency Communication (URLLC), an Enhanced Machine Type Communication (eMTC), best effort traffic and a realtime streaming.

16. The first node of claim 11, wherein the information of the service further comprises information of the communication device.

17. The first node of claim 11, wherein the RRC redirection command message comprises at least one of a connection indication, a redirection indication, a reserve indication and at least one access information of the at least one second node.

18. The first node of claim 17, wherein the connection indication indicates whether the communication device keeps a RRC connection between the communication device and the first node.

19. The first node of claim 17, wherein the reserve indication indicates whether the communication device establishes a RRC connection between the communication device and the first node, when all of at least one RA procedure performed with all of the at least one second node are failed.

20. The first node of claim 17, wherein the at least one access information comprises at least one node configuration of the at least one second node and at least one random access parameter of the at least one second node.

* * * * *